Feb. 1, 1966  R. M. CARRIER, JR  3,232,492
APPARATUS FOR TRANSPORTING MATERIAL BY COMPOUND MOTION
Filed June 4, 1964  2 Sheets-Sheet 1

INVENTOR.
ROBERT M. CARRIER JR.
BY
Marshall, Wilson, Click & Yeasting
-attorneys- Feb. 1, 1966          R. M. CARRIER, JR          3,232,492

APPARATUS FOR TRANSPORTING MATERIAL BY COMPOUND MOTION

Filed June 4, 1964          2 Sheets-Sheet 2

INVENTOR.
ROBERT M. CARRIER JR.

BY Marshall, Wilson, Click & Yeasting
-attorneys-

United States Patent Office 3,232,492
Patented Feb. 1, 1966

3,232,492
APPARATUS FOR TRANSPORTING MATERIAL BY COMPOUND MOTION
Robert M. Carrier, Jr., Louisville, Ky., assignor to Carrier Manufacturing Co., Jeffersonville, Ind., a corporation of Kentucky
Filed June 4, 1964, Ser. No. 374,880
3 Claims. (Cl. 222—161)

This is a continuation-in-part of now abandoned application Serial No. 262,604, filed March 4, 1963.

The invention relates to an apparatus which transports material by imparting compound motion thereto, and which includes a screw conveyor in which the movement of the material is effected and controlled not only by the action of the screw but also by auxiliary mechanism hereinafter described. This auxiliary mechanism imparts motion to the material in addition to the motion imparted by the screw, and the two types of motion are combined or compounded to transport the material.

A screw conveyor mounted on an electromagnetic vibrator is shown in U.S. Patent No. 2,800,252 issued to E. A. Wahl. The electromagnetic vibrator shown in this patent is of the type which is ordinarily used to support a trough in a small vibratory feeder. However, in the apparatus shown in Patent No. 2,800,252 the purpose of vibrating the screw conveyor is to effect uniform screw-conveying of the material by agitating the material to enable the material to flow uniformly into the intake end of the screw conveyor.

Patent No. 2,800,252 indicates that the direction of the vibration of the screw conveyor should be substantially angular to the axis of the screw. The electromagnetic vibrator used for vibrating the screw conveyor shown in Patent No. 2,800,252 was replaced by mechanism designed to vibrate the screw conveyor in a direction perpendicular to the axis of the screw, as indicated by a later patent, No. 2,957,608, issued to the same patentee. This later patent stresses the fact that the direction of the vibration of the screw conveyor is perpendicular to the axis of the screw, and indicates that the vibration of the screw conveyor merely settles the material without tending to cause the material to move axially so that the conveying of the material is effected solely by the action of the screw.

The principal object of the invention is to provide an apparatus that includes a screw conveyor combined with auxiliary mechanism which substantially improves the efficiency of the screw conveyor by forcefully imparting motion to the material in the screw conveyor that is in addition to the motion imparted by the screw, whereby the two types of motion are compounded to transport the material. More specific objects and advantages are apparent from the following description, in which reference is had to the accompanying drawings illustrating preferred embodiments of the invention.

The present invention is based upon the discovery that the efficiency of a screw conveyor can be improved substantially by the use of the several novel features of construction which are employed in the practice of the present invention.

CRITICAL FEATURES OF CONSTRUCTION

*Frequency of vibration of the screw conveyor.—* One critical feature of the present apparatus is that it includes a screw conveyor which is vibrated at a frequency of 300 to 2,000 cycles per minute. It is necessary that the screw conveyor be vibrated at a frequency within this range in order to obtain the improved results which are produced in the practice of the present invention. It is this frequency of vibration that distinguishes the present screw conveyor from the screw conveyor shown in United States Patent No. 2,800,252. The frequency of vibration of the screw conveyor shown in that patent is 3,600 cycles per minute when ordinary 60 cycle alternating current is used to operate the electromagnetic vibrator which is shown in that patent, provided that a half-wave rectifier is used to rectify the 60 cycle alternating current. If a half-wave rectifier is not used to rectify the 60 cycle alternating current supplied to the electromagnetic vibrator, the frequency of vibration of the screw conveyor shown in that patent would be 7,200 cycles per minute.

*Amplitude of vibration of the screw conveyor.—* Logically, the screw conveyor is vibrated at the maximum amplitude that is permitted by the physical limits of the support, in order to obtain the maximum benefit from the vibration. The force required to produce the vibration increases as the amplitude of the vibration increases, so that the amplitude of vibration which can be used is limited by the force to which the parts of the machine can be safely subjected. The actual force required to produce a given vibratory movement is determined by the maximum acceleration which occurs during the vibratory movement. As explained hereinafter, the maximum acceleration which occurs during the vibratory movement varies directly as the amplitude and also varies as the square of the frequency. In the present apparatus, the frequency of vibration of the screw conveyor is only about half the frequency at which the screw conveyor vibrates in the apparatus shown in Patent No. 2,800,252. Thus to produce a given maximum acceleration, corresponding to the maximum force which can be sustained safely by the structure, the amplitude of vibration of the present screw conveyor may be at least four times the amplitude of vibration of the screw conveyor shown in the patent.

*Support on which the conduit of the screw conveyor is mounted for movement in an elongated path extending at an angle to the vertical and at an acute angle to the axis of the screw.—* This feature was present in the apparatus shown in United States Patent No. 2,800,252. However, no material benefit was obtained from this feature in that apparatus because of the high frequency of the vibration of the screw conveyor. Thus in later devices of the same patentee, such as the device shown in Patent No. 2,957,608, this feature was eliminated and the screw conveyor was caused to vibrate vertically, instead of vibrating in a path extending at an angle to the vertical and at an acute angle to the axis of the screw.

*A rotary eccentric drive which is operatively connected to the conduit of the screw conveyor to vibrate the conduit.—* This feature is of value only in combination with the features hereinbefore described, but is essential in order to enable the conduit of the screw conveyor to be vibrated at a frequency from 300 to 2,000 cycles per minute.

*Rotary driving member having an operating speed from 300 to 2,000 r.p.m.—* This rotary driving member is connected to the rotary eccentric drive and operates the rotary eccentric drive to vibrate the conduit of the screw conveyor at a frequency from 300 to 2,000 cycles per minute.

*Screw conveyors.—* The screw cnoveyor in the present apparatus is of the ordinary type and consists of an auger having its axis at an angle to the vertical and a conduit surrounding and closely spaced from at least the lower portion of the auger along at least part of the length of the auger.

*Supply hopper.—* Another essential feature of the present apparatus is a supply hopper extending above and communicating with the inlet end of the screw for keeping the conduit filled with the material at the inlet end of the screw. The principal advantage of the present apparatus is the constancy with which it feeds the material. In order to permit the present apparatus to feed and discharge the material at a constant rate, it is necessary to provide a supply of the material in the supply hopper so as to keep the conduit filled with the material at the inlet end of the screw. The use of any other means to introduce the material into the screw would supply the material to the screw in an erratic manner and would destroy the principal value of the present apparatus because it would prevent the present apparatus from feeding the material at a constant rate.

MATTERS WHICH ARE NOT CRITICAL

*Nature of the material.*—The particular material which is transported by the present apparatus is not a part of the present invention. The materials which may be transported in the present apparatus include all the materials which may be transported in the apparatus shown in United States Patent No. 2,800,252 or in an ordinary screw conveyor. Such materials are well known and include a large number of materials the common characteristic of which is that they do not flow freely. The present apparatus is recommended as a general purpose device for metering or feeding such materials accurately at a more constant rate than any apparatus heretofore known, the degree of improvement in accuracy varying from one material to another.

*Speed of rotation of the screw.*—In the present apparatus as ordinarily constructed, the speed of rotation of the screw is usually indeterminate in that the apparatus includes a variable speed transmission which drives the screw and which permits the operator to select the speed of the screw at will. The present apparatus permits the operator to select and adjust the rate at which the material is fed, and the principal advantage of the present apparatus is that after the operator has selected the rate of feeding of the material, the present apparatus maintains the rate extremely constant. The constancy with which the present apparatus feeds material, once the rate has been selected and set by the operator, is due to the peculiar action of the specific mode of vibration of the conduit which is employed in the present apparatus. This specific mode of vibration has the effect of forcibly propelling the material forward so as to keep the conduit filled with material at all times. The result of this action is to overcome friction which would prevent the material from keeping the conduit full at all points and would cause the rate of flow to be erratic. Although the effect of the specific mode of vibration of the conduit in the present apparatus is to keep the conduit filled with the material, the material cannot flow past the flights of the screw and the material can flow along the conduit only as the rotation of the screw permits such flow. Thus the operator, by merely setting the speed of rotation of the screw at the desired rate, is able to feed the material in a constant flow at the desired rate. The present apparatus feeds the material with improved constancy at any operating speed of the screw, the operating speed of the screw being selected at the will of the operator.

FIG. 1 of the drawings is an elevation of a preferred form of apparatus embodying the invention;

The apparatus of the present invention comprises an auger having its axis at an angle to the vertical. Although the axis of the auger may be inclined to the horizontal, the axis of the auger is usually horizontal or only slightly inclined to the horizontal.

In an apparatus embodying the invention, at least the lower portion of the auger is surrounded by a casing or conduit extending along at least part of the length of the auger. This casing or conduit, for example, may be a trough which has a U-shaped cross section and which is either open or closed at the top.

Figure 1:
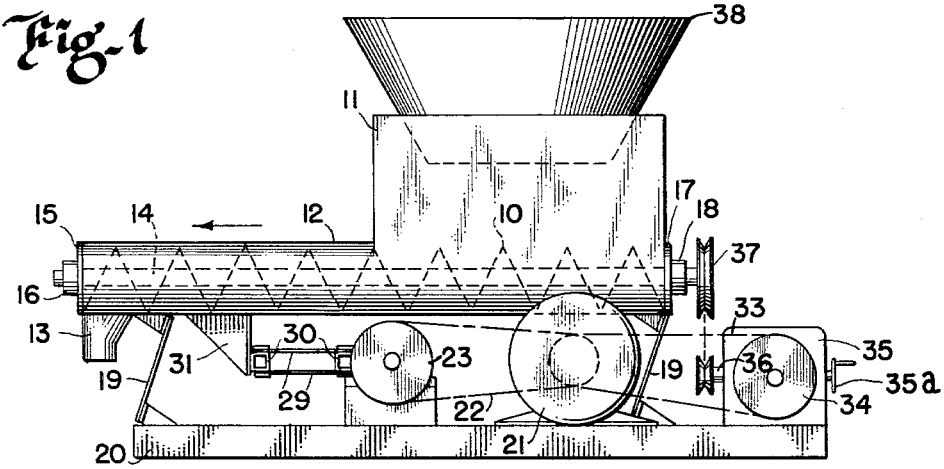

The preferred form of apparatus shown in FIG. 1 includes a screw conveyor that comprises an auger 10, part of which extends through the lower portion of a supply hopper 11 and the remainder of which is surrounded by a casing 12 which in this case may be cylindrical. The casing 12 is provided with a spout 13 through which the conveyed material is discharged from the apparatus. Although the spout 13 discharges the material radially downward, it is to be understood that the material may be discharged axially.

A shaft 14 on which the auger 10 is mounted extends through an annular plate 15 that closes the discharge end of the casing 12, and is journaled in a bearing 16 that is secured on the outer side of the annular plate 15. The other end of the shaft 14 extends through a hole which is provided in the end of the supply hopper 11 and is surrounded by a second annular plate 17 secured on the outside of the supply hopper. Mounted on this annular plate is a second bearing 18 for the shaft 14.

The screw conveyor including the supply hopper 11 and casing 12 is mounted by means of leaf springs 19 on a base 20. These leaf springs, which may be of any suitable spring material, such as steel or laminated glass fiber, are inclined slightly to the vertical. Thus as the leaf springs 19 are flexed, the screw conveyor moves through a substantially linear path which extends at an acute angle to the axis of the auger 10. Leaf springs, however, are only one example of a support that mounts the casing 12 for movement in an elongated path.

Power for vibrating the screw conveyor is supplied from a motor 21 mounted on the base 20, through a belt 22 which drives a pulley 23. This pulley is fixed to a rotary driving member consisting of a shaft 24 (FIG. 2) which is journaled in a pair of bearing blocks 25 supported from the base 20. The shaft 24 operates a rotary eccentric drive consisting of an eccentric 26 which is keyed to the central portion of the shaft 24 and which rotates in a bearing 27. The bearing 27 is fixed in a bearing block 28 that forms part of driving structure which may be generally described as a link.

This driving link includes a pair of leaf springs 29 which are secured at each end to a section of square tubing 30. One of these sections of square tubing is welded to a bracket 31 on the bottom of the casing 12, and the other section of square tubing is welded to a plate 32 which is bolted to the bearing block 28.

As the shaft 24 is rotated by the motor 21, the rotary eccentric drive acts through the connecting link to vibrate the screw conveyor in a path determined by the leaf springs 19 that support the screw conveyor.

The motor 21, acting through a belt 33 and a pulley 34, also drives a gear reduction unit 35 having an output shaft 36. In order to provide a rotary drive for rotating the auger in a direction such as to move the material toward the discharge end of the casing 12, the output shaft 36 is provided with a suitable pulley and belt through which it drives a pulley 37 secured to the shaft 14 on which the auger 10 is mounted. In this manner the motor 21 supplies power also for rotating the auger 10.

In order that the output of the screw conveyor shown in FIG. 1 may be varied, the gear reduction unit 35 is of the variable ratio type and is provided with a handwheel 35a by means of which the speed of the output shaft 36 may be adjusted. It is to be undestood that the gear reduction unit 35, instead of being driven by the motor that furnishes power for the rotary eccentric drive, may be driven by a separate motor. If such separate motor is a variable speed motor, the gear reduction unit 35 may be of the fixed ratio type instead of the variable ratio type.

A chute indicated diagrammatically at 38, which extends into the supply hopper 11, may be kept filled with material to be conveyed. With this arrangement the level of the material in the supply hopper 11 normally will remain substantially at or slightly below the level of the lower end of the chute 38, and the flights of the auger 10 inside the casing 12 will be completely filled with material during the operation of the apparatus.

In the apparatus shown in FIG. 1 the bearings 16 and 18 in which the auger is mounted are supported from the conduit or casing 12 so that the auger itself vibrates with the conduit. If desired, however, the bearings in which the auger is mounted may be supported directly from the base, as in the apparatus disclosed in application Serial No. 288,112, filed by Elmer J. Renner on June 17, 1963, so that the auger does not vibrate with the conduit but merely rotates.

Figure 2:
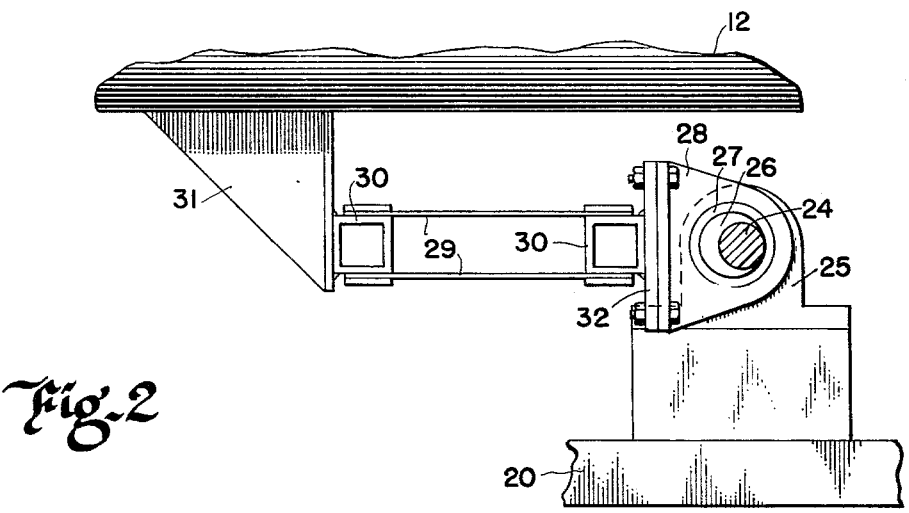
FIG. 2 is a fragmentary elevation on an enlarged scale, partly in section, of the apparatus shown in FIG. 1.
Figure 3:
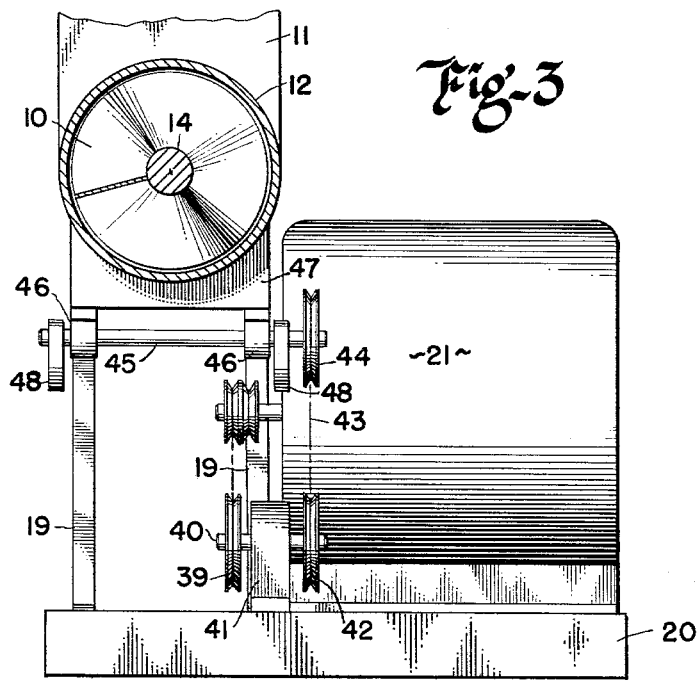
FIG. 3 is a transverse section of a modified form of apparatus on the same enlarged scale.

The modified form of apparatus shown in FIG. 3 is the same as the preferred form of apparatus shown in FIGS. 1 and 2 except that a different form of rotary eccentric drive used to vibrate the screw conveyor in the apparatus of FIG. 3.

In the apparatus of FIG. 3, the motor 21 drives a pulley 39 which is secured to one end of an idler shaft 40 journaled in a bearing block 41 mounted on the base 20. Fixed to the other end of the idler shaft 40 is a second pulley 42 for driving a belt 43 which in turn drives a pulley 44 which is located vertically above the pulley 42 and is fixed on the end of a shaft 45. The shaft 45 is journaled in two bearing blocks 46 mounted on a bracket 47 which is secured to the bottom of the casing 12. This shaft constitutes a rotary driving member, and it operates a rotary eccentric drive consisting of a pair of eccentric weights 48 secured to the shaft. As the shaft 45 is rotated, the centrifugal force exerted by the eccentric weights 48 causes the screw conveyor to vibrate along a path determined by the leaf springs 19 on which the screw conveyor is supported.

In the apparatus of FIG. 3 the leaf springs 19 are the sole support of the screw conveyor, whereas in the apparatus of FIG. 1 the screw conveyor is restrained longitudinally by the leaf springs 29 so that the supporting function of the leaf springs 19 could be performed by replacing each of the leaf springs 19 with a strut that is pivoted at its top to the casing 12 and at its bottom to the base 20. However, both in the apparatus of FIG. 1 and in the apparatus of FIG. 3 the leaf springs 19, in addition to their functions of supporting the screw conveyor and guiding its vibratiory movement, perform an important additional function in that they resiliently urge the screw conveyor toward an intermediate position in its path of vibratory movement. This makes it possible to tune the system consisting of the leaf springs 19 and the mass supported thereon in FIG. 1 or FIG. 3 in such a manner that the natural frequency of vibration of the system approaches the frequency of the vibrations imparted to the system by the rotary eccentric drive.

In fact, the system shown in FIG. 1 may be tuned so that when the supply hopper 11 and the casing 12 are filled with a normal load of material the natural frequency of the system is the same as the frequency at which the system is vibrated by the rotary eccentric drive with the motor 21 operating at its normal speed. Under these conditions, the system is vibrated at its natural frequency on the springs 19, and the system draws only enough power from the rotary eccentric drive to overcome frictional loses so that the rotary eccentric drive imposes only a relatively small load on the motor 21.

In the system shown in FIG. 3, the amplitude of vibration is not fixed like that of the system shown in FIG. 1. The frequency at which the system of FIG. 3 is vibrated by the eccentric weights 48 when the motor is operating at its normal speed should be a small amount, for example ten percent, less than the natural frequency of vibration of the system consisting of the supporting leaf springs and the mass which is carried by the leaf springs when the supply hopper and the casing are filled with a normal load of material. Then the presence of an unusually heavy load of material in the system will increase the mass and thereby reduce the natural frequency of vibration of the system. This reduction in the natural frequency of vibration of the system will bring the natural frequency down closer to the frequency of the vibrations which are being imposed upon the system by the eccentric weights 48. Such closer approach between the natural frequency of vibration and the imposed frequency of vibration will tend to cause the system to vibrate at a greater amplitude at the imposed frequency of vibration. However, this tendency of the amplitude of vibration to increase under a heavier load will be counteracted by the increased damping and increased frictional losses which are imposed upon the system by the heavier load.

Thus the use of an operating frequency of the rotary eccentric drive which is somewhat less than the natural frequency of vibration of the system shown in FIG. 3 tends to compensate for changes in the weight of material carried in the system so as to maintain a relatively constant amplitude of vibration. In any event, the frequency at which the system of FIG. 3 is vibrated by the eccentric weights 48 must not be the same as the natural frequency of vibration of the system. If the frequency of the vibrations imposed by the eccentric weights were the same as the natural frequency, the system would tend to "run away," i.e., the amplitude of vibration at the natural frequency would tend to become greater and greater, with danger of breakage of the supporting leaf springs.

The characteristic of the apparatus of FIG. 1 which distinguishes it from the apparatus of FIG. 3 is the fact that in the apparatus of FIG. 1 the rotary eccentric drive is mounted independently of the conduit and is coupled to the conduit by a positive reciprocatory driving member. This member may consist of any member that couples the rotary eccentric drive to the conduit so as to provide a mechanical movement which translates the orbital motion of the rotary eccentric drive into vibratory motion of the conduit.

This distinction between the apparatus of FIG. 1 and the apparatus of FIG. 3 is important, because the coupling of the rotary eccentric drive to the conduit by means of a positive reciprocatory driving member precisely fixes the amplitude of vibration of the conduit. As a result, an increase in the weight of material carried by the system does not cause damping of the vibration, and the output of the apparatus may be precisely controlled by controlling the speed of rotation of the auger.

Another advantage of fixing the amplitude of vibration by means of a positive reciprocatory driving member is that the system may be tuned to operate at its natural frequency, so as to reduce power consumption to a minimum. Since the amplitude of vibration is fixed, the system cannot "run away" at its natural frequency.

In the interest of simplicity, a relatively small apparatus is shown in FIG. 1 as well as in FIG. 3. Such a relatively small apparatus is useful primarily as a "feeder," for feeding a particulate material at a precisely controlled rate, rather than merely conveying the material from one point to another. In the case of a relatively large conveyor embodying the invention, a fixed throughput may be desired so that a constant speed drive may be used to rotate the auger.

An apparatus embodying the invention is substantially more effective than any apparatus heretofore known in producing a precisely controlled uniform flow of a material which tends to flow erratically. However, an apparatus embodying the invention also operates with substantially greater efficiency than any prior apparatus in conveying non-freely flowing materials over relatively long distances.

The rotary eccentric drives shown in FIGS. 1 and 3 have been selected to illustrate the invention because of their simplicity, and may be replaced by various other eccentric drives for vibrating the screw conveyor in an elongated path extending at an angle to the vertical and at an acute angle to the axis of the auger. Many types of rotary eccentric drives for generating vibrations are known, and many of them include balancing arrangements for confining the vibratory forces to the vibratory system so as to avoid imparting vibrations to the building in which the system is housed. However, the rotary eccentric drive used in the practice of the present invention must have an operating speed of not greater than about 2000 r.p.m., and must be capable of vibrating the casing or conduit of the screw conveyor with a stroke of sufficient length so that the maximum acceleration of the conduit is at least substantially as great as the acceleration of gravity.

Figure 4:
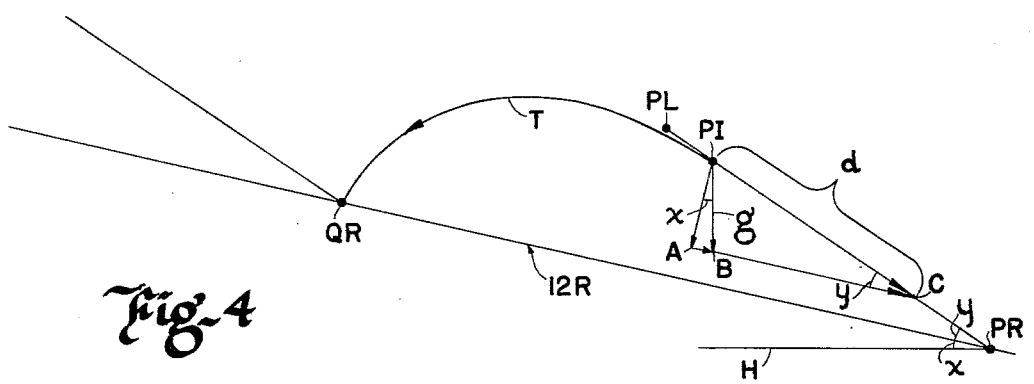
FIG. 4 is a diagram illustrating the motion that is imparted to the material in a screw conveyor by a rotary eccentric drive in the practice of the present invention.

FIG. 4 illustrates the motion which the rotary eccentric drive used in the practice of the invention tends to impart to a particle of material in the apparatus. As illustrated in FIG. 4, this motion consists of a succession of jumps or surges toward the left, and it is to be understood that the sense of rotation of the auger is such that the auger also tends to move the material toward the left.

It should be noted also that FIG. 4 represents the case in which the conduit or casing of the screw conveyor and the axis of the auger are inclined upward toward the left, the angle of inclination from the horizontal being shown in FIG. 4 as the angle $x$.

In FIG. 4 the line 12R represents the extreme right-hand position that is occupied by the bottom of the conduit or casing of the screw conveyor at the instant when the conduit is at the right-hand extremity of its vibratory movement. Thus the line PL–PR represents the path of vibratory movement of a point on the bottom of the conduit of the screw conveyor. As this point on the conduit travels through such path from right to left during the vibratory movement of the conduit, a particle of material resting on the bottom of the conduit at this point tends to travel through the same path. However, as the conduit approaches the left-hand extremity of its vibratory movement, its upward movement is decelerating. If the deceleration of the upward movement of the conduit is great enough relative to the downward acceleration of a particle resting on the bottom of the conduit that is produced by the force of gravity acting upon the particle, the conduit will be decelerated and stopped so quickly at the left-hand extremity of its vibratory movement that the force of gravity acting on the particle will not cause the particle to remain in contact with the bottom of the conduit, and the particle will in effect become a projectile traveling through the air in a trajectory such as that indicated as T in FIG. 4.

FIG. 4 includes a vector diagram in which the vector PI–B represents the downward acceleration $g$ produced by the force of gravity acting upon a particle of material resting on the bottom of the conduit at the instant when the particle is at the position PI. The deceleration $d$ of the conduit may be resolved into a component PI–A perpendicular to the bottom of the conduit and a component A–C parallel to the bottom of the conduit. The inertia of the particle at the position PI tends to keep the particle moving in the direction PI–PL and at the velocity at which the particle is traveling at the position PI. Thus the component A–C parallel to the bottom of the conduit is the component of the deceleration $d$ which tends to cause the inertia of the particle to slide the particle forward along the conduit, and the component PI–A perpendicular to the bottom of the conduit is the component of the deceleration $d$ which tends to cause the inertia of the particle to lift the particle out of contact with the conduit.

The acceleration $g$ produced by the force of gravity acting upon the particle at the position PI may be resolved into a component PI–A perpendicular to the bottom of the conduit which tends to keep the particle in contact with the conduit and a component A–B parallel to the bottom of the conduit which tends to cause the particle to slide backward along the inclined bottom of the conduit.

In the case illustrated in FIG. 4 the component PI–A of the acceleration $g$ produced by the force of gravity at the instant when the particle is at the position PI coincides exactly with the corresponding component of the deceleration of the conduit, i.e., $g \cos x$ equals $d \sin y$. Thus the pressure of the particle against the conduit is zero at the position PI. Then as the conduit continues to travel toward the left during its vibratory movement, the deceleration of the conduit will increase until it reaches a maximum $d_{max.}$ at the instant when the conduit reaches the left-hand extremity of its stroke. Accordingly, after the particle has moved to the left of the position PI the downward acceleration produced by gravity will not cause the particle to remain in contact with the bottom of the conduit.

In the case illustrated in FIG. 4, the conditions are such that the particle after passing the position PI will travel through the trajectory T, and the impact of the particle on the bottom of the conduit at the position QR will occur at the instant when the bottom of the conduit has reached the position 12R at the right-hand extremity of its vibratory movement. Immediately after the particle strikes the bottom of the conduit at the position QR, it will remain on the bottom of the conduit while the conduit executes the initial part of its succeeding movement toward the left and will be subjected to forces similar to those to which it was subjected during the preceding stroke, so that the particle then will follow a path as indicated in FIG. 4 which is similar to the path that the particle followed in traveling from the position PR to the position QR. In the case illustrated in FIG. 4 it is assumed that there is no bouncing or slipping of the particle on the bottom of the conduit.

The deceleration $d_{max.}$ which is attained at the instant when the conduit reaches the left-hand extremity of its stroke in the devices of FIGS. 1 and 3 may be computed in inches per second per second from the equation $$d_{max.} = 19.74 f^2 s$$

in which $f$ is the frequency of vibration in cycles per second and $s$ is the stroke (for example, PL–PR) in inches.

In the practice of the present invention, the frequency of vibration must be not more than about 2000 cycles per minute, or 33⅓ cycles per second, and $d_{max.}$ must be at least substantially as great as $g$, the acceleration of gravity, which is normally about 386 inches per second per second.

The foregoing explanation of the vector diagram in FIG. 4 shows that a particle resting on the bottom of the conduit will not leave the bottom of the conduit unless $d_{max.} \sin y$ is greater than $g \cos x$. However, $\sin y$ is equal to $\cos x$ when $x + y = 90°$, so that $\sin y$ cannot be greater than $\cos x$ unless $x + y$ is greater than 90°. Yet $x + y$ must always be less than 90° in the practice of the present invention because the path of vibratory movement always extends at an angle to the vertical.

Thus in the practice of the invention $\sin y$ is always less than $\cos x$. It follows that in the extreme case in which $d_{max.}$ is equal to $g$, $d_{max.} \sin y$ is less than $g \cos x$, so that the vibratory movement of the conduit will not cause a particle resting on the bottom of the conduit to leave the bottom of the conduit.

However, in the practice of the invention it is not necessary that a particle resting on the bottom of the conduit actually leave the bottom of the conduit as the conduit approaches the end of its forward vibratory stroke, because a very important effect that is obtained in the practice of the invention is the slippage of particles resting on the bottom of the conduit which occurs as the deceleration of the conduit approaches a maximum near the end of the forward vibratory stroke of the conduit. As illustrated in FIG. 4, this slippage occurs because of the fact that the component A–C of the deceleration of the conduit is much greater than the component A–B of the acceleration caused by the force of gravity acting on a particle. Neglecting friction, it is evident that a particle on the bottom of the conduit at the position PI actually will be sliding forward because the backward component A–C of the deceleration of the conduit is much greater than the backward component A–B of the acceleration produced by the force of gravity acting on the particle. Even in the extreme case in which $d_{max.}$ does not exceed $g$, the component A–C (which is equal to $d_{max.}$ cos $y$) is greater than the component A–B (which is equal to $g$ sin $x$), because sin $x$ is always less than cos $y$ as explained above.

It should be noted also that the deceleration of the conduit as it approaches the end of its forward stroke tends to counteract the force of gravity and thus tends to reduce the pressure of the particle against the bottom of the conduit so as to reduce friction and enable the particle to slide forward along the conduit under the influence of the component A–C of the deceleration of the conduit which exceeds the component A–B of the acceleration of gravity.

On the other hand, during the second half of the backward stroke of the conduit, the deceleration of the conduit is in the opposite direction and thus adds to the pressure of a particle against the bottom of the conduit that is caused by the force of gravity. Thus the particle, which is allowed to slide forward near the end of the forward stroke of the conduit, is held tightly against the conduit near the back end of the stroke and is prevented from sliding backward under the action of the forces prevailing near the back end of the stroke. The forward slippage of particles on the bottom of the conduit which is thus permitted near the end of the forward stroke, while backward slippage is prevented near the back end of the stroke, is an important effect which is obtained in the practice of the invention even when the deceleration of the conduit is not great enough to permit the particles to travel through the air in a trajectory such as the trajectory T in FIG. 4.

In order to obtain the greatest improvement in the practice of the invention, it is preferable that the axis of the auger be generally horizontal and that the vertical component ($d_{max.}$ sin $x+y$) of the maximum acceleration $d_{max.}$ of the conduit be greater than the acceleration of gravity.

An apparatus of the type shown in FIGS. 1 and 2 has a definite stroke which is determined by the eccentricity of the rotary eccentric drive. An apparatus of this type is preferred to an apparatus of the type shown in FIG. 3. In the apparatus shown in FIG. 3, the length of the vibratory stroke cannot be determined with absolute precision. The length of the stroke in this case depends upon the mass of the screw conveyor, the stiffness of the leaf springs on which the screw conveyor is mounted, the mass and eccentricity of the eccentric weights, and the relationship between the speed at which the eccentric weights are rotated and the natural frequency of vibration of the system.

However, even the apparatus shown in FIG. 3 is clearly superior in efficiency to a screw conveyor mounted on an electro-magnetic vibrator. An electro-magnetic vibrator operating at a frequency of 3600 cycles per minute, if used to support a screw conveyor, would vibrate the screw conveyor at such a low amplitude as to produce substantially none of the beneficial results which are obtained in the practice of the present invention. For example, if an electro-magnetic vibrator were used to vibrate a screw conveyor at a frequency of 3,600 cycles per minute with a maximum acceleration equal to 5.75 times the acceleration of gravity, the vibratory stroke would be only $\frac{1}{32}$ inch in length. In contrast, the use of a rotary eccentric drive in accordance with the present invention to vibrate a screw conveyor at a frequency of 2,000 cycles per minute, with a maximum acceleration equal to 5.75 times the acceleration of gravity, would provide a vibratory stroke more than $\frac{1}{10}$ inch in length.

The use of a rotary eccentric drive is necessary in the practice of the invention in order to provide a frequency of vibration not greater than 2,000 cycles per minute. This lower frequency of vibration is necessary in order to afford a vibratory stroke, extending at an angle to the vertical, which is of sufficient length to produce a substantial improvement in the efficiency of the screw conveyor. At the relatively high frequency at which an electro-magnetic vibrator operates, it is not possible to produce a vibratory stroke of the required length merely by supplying more power to increase the force tending to accelerate the screw conveyor in its vibratory movement, because of the inability of supporting springs to withstand the increased force.

The relatively low frequency and relatively long vibratory stroke which are afforded by the use of a rotary eccentric drive in the practice of the present invention are necessary in order to produce the desired action upon the non-free flowing materials which are customarily transported by means of a screw conveyor, particularly in view of the confined nature of the spaces in which such materials are held between the flights of the screw conveyor.

Preferably the rotary eccentric drive in an apparatus embodying the invention is operated at a relatively low speed so as to make it possible to employ a relatively long vibratory stroke, ranging from $\frac{3}{16}$ inch to 1 inch. For example, the apparatus may be vibrated with a stroke of $\frac{1}{2}$ inch at a frequency as high as 900 cycles per minute or as low as 400 cycles per minute. A large conveyor embodying the invention may be vibrated with a stroke of 1 inch at a frequency as high as 600 cycles per minute or as low as 300 cycles per minute.

In order to produce the best results, the angle $y$ should be at least 5°. The preferred range for the angle $y$ is from 10° to 30°. However, the angle $y$ may be as great as 40°, and $x+y$ may be as great as 80°. On the other hand, the axis of the auger may be inclined downward from the horizontal, the angle of inclination preferably being less than 45°.

Having described the invention I claim:

1. An apparatus for transporting non-freely flowing material by imparting compound motion thereto, comprising, in combination, an auger having its axis at an angle to the vertical, a conduit surrounding and closely spaced from at least the lower portion of the auger along at least part of the length of the auger, a support on which the conduit is mounted for movement in an elongated path extending at an angle to the vertical and at an acute angle to the axis of the auger, a rotary driving member having an operating speed from 300 to 2000 r.p.m., a rotary eccentric drive which is connected to the rotary driving member and is operatively connected to the conduit and which operates at said speed to vibrate the conduit along said path with a stroke that is long enough to produce a maximum acceleration at least as great as the acceleration of gravity but is within the physical limits of the support, a rotary drive connected to the auger which rotates the auger so as to move the material along the conduit in the direction in which the vibration tends to move the material, and a supply hopper extending above and communicating with the inlet end of the auger for keeping the conduit filled with the material at the inlet end of the auger.

2. An apparatus as claimed in claim 1 wherein the axis of the auger is generally horizontal.

3. An apparatus as claimed in claim 1 wherein the rotary eccentric drive is mounted independently of the conduit and is provided with a positive reciprocatory driving member coupling the rotary eccentric drive to the conduit which translates the orbital motion of the rotary eccentric drive into vibratory motion of the conduit.

References Cited by the Examiner

UNITED STATES PATENTS

| | | | |
|---|---|---|---|
| 2,794,577 | 6/1957 | Van Leeuwen | 222—239 X |
| 2,800,252 | 7/1957 | Wahl | 222—413 |
| 2,957,608 | 10/1960 | Wahl | 222—161 |
| 3,050,215 | 8/1962 | Williams | 222—161 |

RAPHAEL M. LUPO, *Primary Examiner.*